United States Patent [19]
Taylor et al.

[11] Patent Number: 5,265,647
[45] Date of Patent: Nov. 30, 1993

[54] APPARATUS FOR TRANSFERRING LINE TRAVEL DEVICE FROM ONE PIPELINE SECTION TO ANOTHER

[75] Inventors: Sidney A. Taylor, Houston; Stanley J. Rogala, Katy, both of Tex.

[73] Assignee: CRC-Evans Pipeline International, Inc., Houston, Tex.

[21] Appl. No.: 745,598

[22] Filed: Aug. 15, 1991

[51] Int. Cl.5 ............................................. F16L 55/18
[52] U.S. Cl. ........................................ 138/89; 138/98; 118/DIG. 11
[58] Field of Search ............... 138/89, 97, 98, 99, 138/155; 29/890.031, 402.03, 402.09, 402.14; 118/500, 503, DIG. 11, DIG. 13, 324; 14/27, 78; 285/370, 397

[56] References Cited

U.S. PATENT DOCUMENTS

| | | | |
|---|---|---|---|
| 172,528 | 1/1876 | Walker | 138/91 |
| 1,344,914 | 6/1920 | Louden | 285/397 |
| 2,068,765 | 1/1937 | Quinlan | 285/397 |
| 2,401,453 | 6/1946 | Bell et al. | 14/27 |
| 2,746,516 | 5/1956 | Cummings | 118/DIG. 11 |
| 3,183,939 | 5/1965 | Immel | 138/97 |
| 3,606,408 | 9/1971 | Wagner | 285/397 |
| 4,253,497 | 3/1981 | Martin et al. | 138/97 |
| 4,504,171 | 3/1985 | Florence, Jr. | |
| 4,953,496 | 9/1990 | Taylor et al. | 134/199 |

FOREIGN PATENT DOCUMENTS

| | | | |
|---|---|---|---|
| 232633 | 12/1984 | Japan | 285/397 |
| 756127 | 8/1980 | U.S.S.R. | 285/397 |
| 2045116 | 10/1980 | United Kingdom | 118/DIG. 11 |

OTHER PUBLICATIONS

European Search Report dated Nov. 10, 1992.

*Primary Examiner*—James E. Bryant, III
*Attorney, Agent, or Firm*—Richards, Medlock & Andrews

[57] ABSTRACT

A plug (10) is disclosed which is clamped to the end of a first pipeline section (14) being worked on by a line travel device (12). The line travel device (12) can completely perform its operation on the first pipeline section and move on to the plug. The plug is then unclamped from the first pipeline section and the plug and line travel device are moved together to the second pipeline section (16) to be worked on. The plug is clamped to the second pipeline section (16) to be worked on and the line travel device moves off the plug onto the second pipeline section to perform its operation on the entire length of the section.

12 Claims, 4 Drawing Sheets

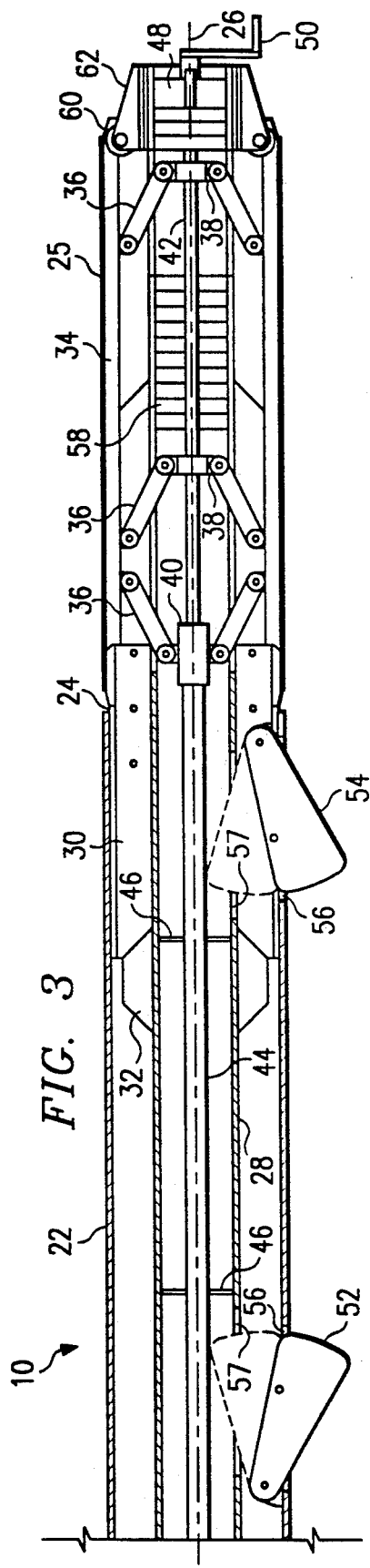
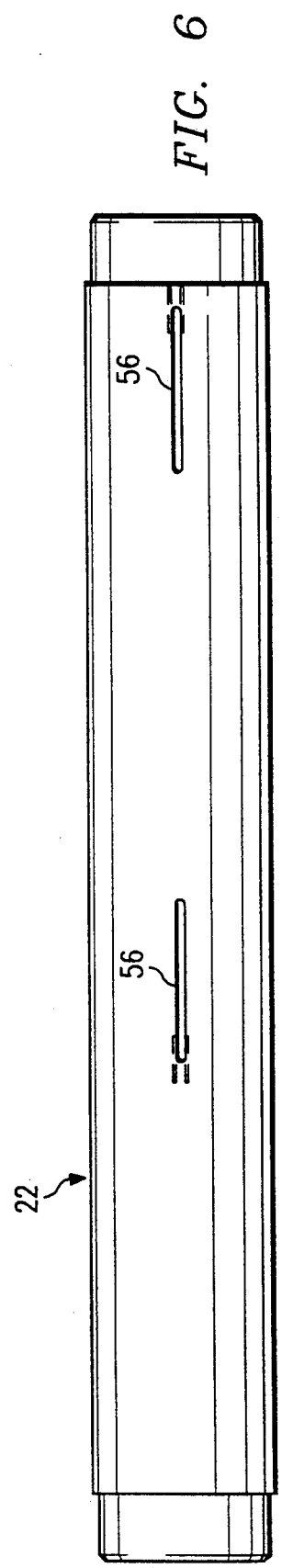
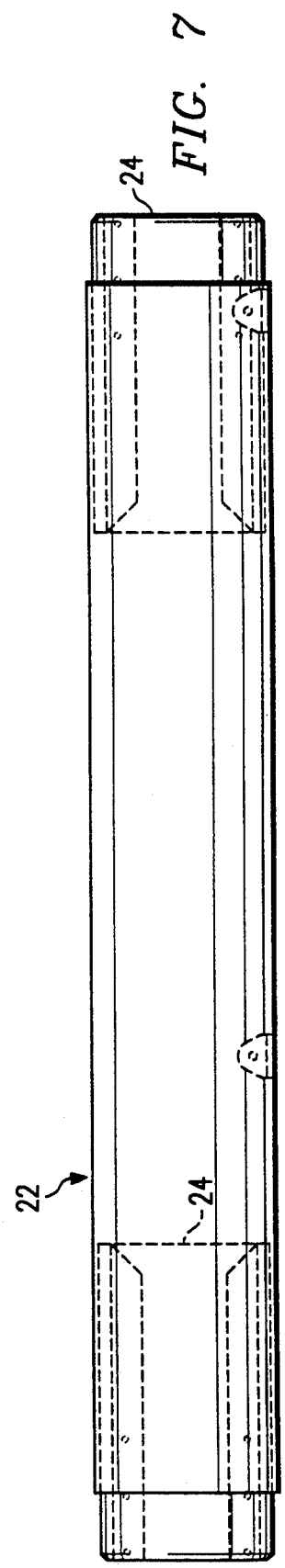

APPARATUS FOR TRANSFERRING LINE TRAVEL DEVICE FROM ONE PIPELINE SECTION TO ANOTHER

TECHNICAL FIELD OF THE INVENTION

This invention relates to handling pipeline sections, and in particular to a transfer of a line travel device from one pipeline section to another.

BACKGROUND OF THE INVENTION

In an effort to maximize the service life and integrity of a pipeline, the pipeline is commonly coated with a protective coating which provides a primary corrosion barrier and reduces the ravages of corrosion. In the past, pipelines have been coated with coal tar enamel, asphalt or tape coatings. More recently, plural-component epoxy-like coatings have been developed for coating.

The coating of a new pipeline, or the cleaning and recoating of an existing pipeline are expensive undertakings. Over the years, many devices have been developed which actually travel along a section of the pipeline to perform part of the operation. For example, line travel devices have been developed which brush a pre-existing line, remove existing coatings using high pressure water jets and prepare the surface of the line using mechanical blast and air abrasive blast machines. Line travel devices also exist which apply a cold applied tape coating, apply a coal tar enamel or apply a plural component coating system. Many of these devices perform more than one operation to the pipeline as it moves along.

Whether the pipeline is being built for the first time, or the line has been dug up out of the ground, the pipeline is laid on the ground for preparation or rehabilitation. In each of these instances, the pipeline will consist of many joints of pipe, usually welded together into a section. The pipeline sections may be as short as 200 feet and up to a mile long, depending on right of way and other considerations. Each section of the pipeline must undergo all operations done by the line travel equipment.

After completing the operation on one pipeline section, the line travel device must be taken off the section and placed onto the next pipeline section to begin work. This is a complicated and time consuming operation resulting in considerable nonproductive time. Line travel devices normally require two side booms for operation. One side boom, called a cradling side boom, is used to lift the pipeline section ahead of the line travel device. This side boom uses a cradle to support the line and holds the line travel device upright. A second side boom is referred to as a catch-off side boom and is used, among other things, to hold the pipeline when taking the line travel device off the line and installing it on the new section.

The process of getting on and off a pipeline section includes the following steps:

1. The cradling side boom holding the cradle will continue to the end of the pipeline section, bringing the cradles as near to the end of the pipeline section as is safe.

2. The line travel device will travel up to the cradles and then stop whatever operation is being done.

3. The catch-off side boom will come behind the line travel device and hold up the pipeline section using a belt or sling.

4. The cradling side boom will lower the pipeline section until the entire pipeline section weight is supported by the catch-off side boom.

5. The cradling side boom will then pull ahead and drop the cradles on the ground. If the cradles are being used in a surface preparation or coating application, the cradle must be placed on a tarp to prevent them from becoming dirty.

6. The cradling side boom then backs up and attaches directly to the line travel device.

7. The line travel device resumes operation and the cradling side boom "walks" the device off the end of the pipeline section.

8. The catch-off side boom lowers the pipeline section to the pipe supports and removes the belt or sling.

9. The catch-off side boom comes around in front of the cradling side boom and picks up the cradles taken off the line earlier.

10. The catch-off side boom then installs the cradles on the next section of pipeline and moves ahead.

11. The catch-off side boom raises the new section of pipeline using a belt or sling.

12. The cradling side boom then installs the line travel device on the new section of pipeline.

13. The cradling side boom disconnects from the line travel device and pulls ahead and connects to the cradles.

14. The cradling side boom lifts the pipeline section and backs up into position within the guides or stinger of the line travel device.

Only after all these steps have been completed is the line travel device ready to begin operation on the new pipeline section.

This procedure has inherent problems, among which are the following:

1. It is very time consuming, frequently requiring between 40–60 minutes depending upon terrain. The average pipeline construction or rehabilitation project will have three to five different sections per mile. This equates to as much as five hours of nonproductive time each mile just in removing the line travel device from one section and putting it on the next section.

2. The stopping and restarting of the line travel device at the end of the line frequently results in a poorer quality of service performed on the last 30–40 feet of the line.

3. The line travel service performed while the cradling side boom is walking the unit off the end of the pipeline section is poorer because the travel rate is dictated by the speed of the side boom, not the internal drive components of the line travel device.

4. The line travel device is subject to damage while it is being taken off the pipeline section and installed on the new pipeline section.

5. Taking the line travel device on and off the pipeline section poses a danger to personnel in the area. The line travel devices are often very heavy, weighing as much as 21,000 pounds. The line travel devices are subject to swinging and rotating when they are being moved from one section to another. Personnel are required to steady the equipment and guide it on to the new section, a dangerous operation.

As can be clearly seen, an improved apparatus and method for transferring a line travel device from one pipeline section to another is needed. Ideally, the apparatus and method would reduce the time required to perform this operation while minimizing the possibility of damage to the equipment or harm to the personnel operating it.

SUMMARY OF THE INVENTION

In accordance with one aspect of the present invention, a plug is provided for use in facilitating the movement of a line travel device from one pipeline section to another while treating pipeline with the line travel device. The line travel device moves along the length of a first pipeline section for performing its operation up to a first end of the pipeline section. The line travel device is subsequently moved to a second pipeline section at a second end of the pipeline section for movement along and performing its operation to the second pipeline section. The plug includes a central housing and an outer pipe secured about the central housing having an outer diameter approximately equal to the outer diameter of the pipeline sections. An inner pipe centering support is mounted to the central housing which has structure therein for expanding the effective diameter of the inner pipe centering support so that at a first diameter, the inner pipe centering support can fit within the ends of the pipeline sections, and at a second diameter, the inner pipe centering support is tightly clamped to the pipeline section.

The line travel device will perform its operation up to the first end of the first pipeline section. With the plug clamped to the first pipeline section, the line travel device moves onto the outer pipe of the plug and the line travel device and plug can then be removed from the first pipeline section and inserted into and clamped to the second pipeline section where the cradle and line travel device can simply move off the plug onto the second pipeline section.

In accordance with another aspect of the present invention, a method is provided for using a plug to transfer a line travel device from a first pipeline section to a second pipeline section. The method includes the step of clamping an inner pipe centering support on the plug at a first end of the first pipeline section. The line travel device will move along the pipeline section, performing its operation on the pipeline section and moving onto an outer pipe on the plug which has an outer diameter equal to the outer diameter of the first pipeline section.

The method further includes the steps of unclamping the plug from the first pipeline section and moving the plug and line travel device to a second end of a second pipeline section. The plug is clamped in the end of the second pipeline section and the line travel device moves off the plug to perform its operation on the second pipeline section.

BRIEF DESCRIPTION OF THE DRAWINGS

For a more complete understanding of the present invention and the advantages thereof, reference is now to made to the following description taken in conjunction with the accompanying drawings in which:

FIG. 3 is a vertical cross-sectional view through one end portion of the plug;

FIG. 6 is a bottom view of the outer pipe;

FIG. 7 is a side view of the outer pipe with the inner pipe centering supports installed;

DETAILED DESCRIPTION

Figure 1:
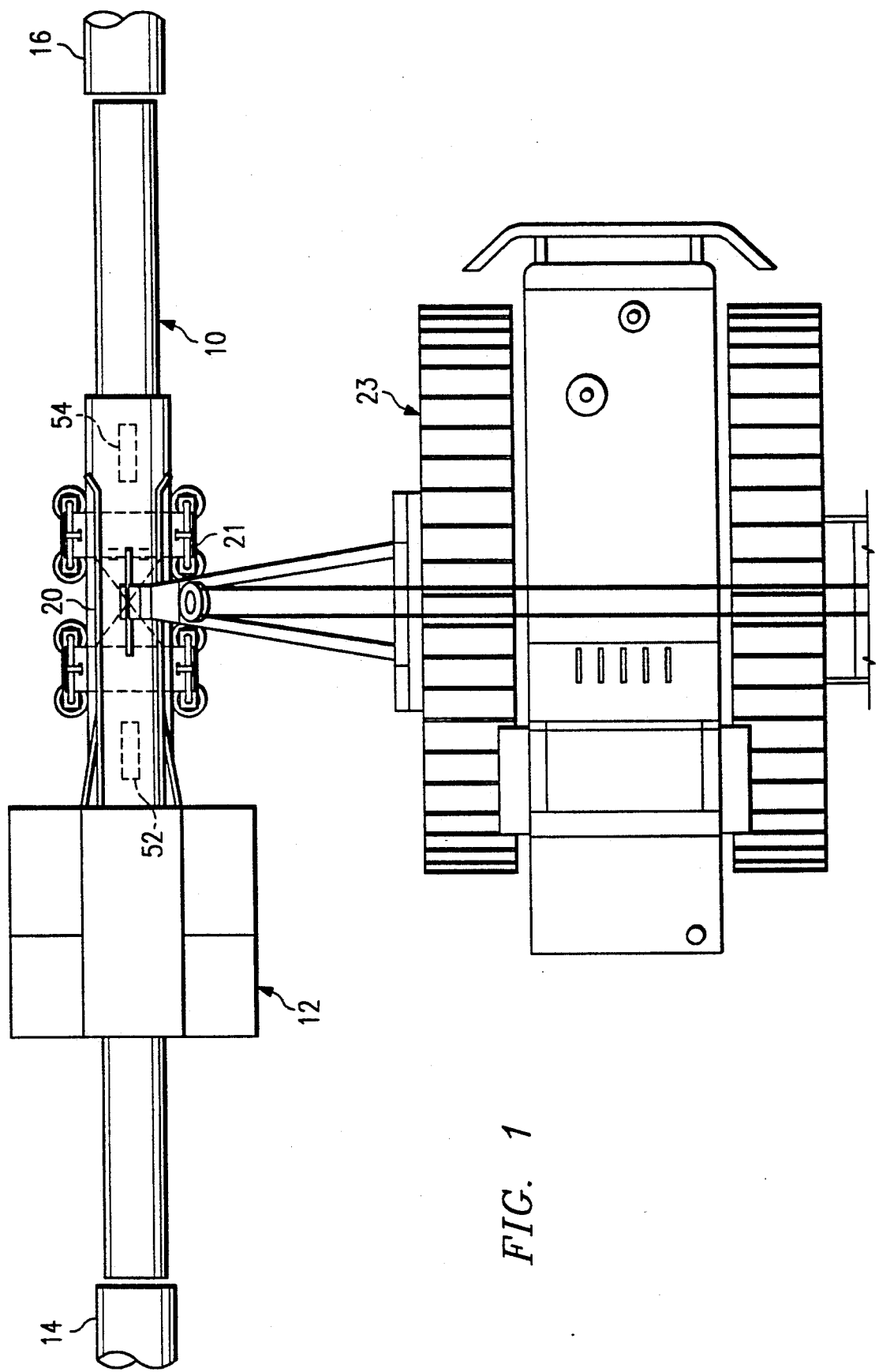
FIG. 1 is an illustrative view showing first and second pipeline sections, a line travel device for performing an operation on the pipeline sections, and a plug forming a first embodiment of the present invention to facilitate transfer of the line travel device from one pipeline section to the other.

With reference now to the accompanying drawings, wherein corresponding parts are identified by the same reference numeral through the several views, there is illustrated in FIG. 1 a plug 10 forming a first embodiment of the present invention. The plug 10 is used to facilitate the movement of a line travel device 12 from a first pipeline section 14 to a second pipeline section 16. Device 12 can be a coating device as disclosed in U.S. Pat. No. 4,953,496 issued Sep. 4, 1990, which disclosure is incorporated in its entirety herein.

The plug 10 is a device that is inserted into the end of the pipeline section being worked on by the line travel device. This plug, in essence, extends the length of the pipeline section by about 20 feet and eliminates the need to stop the line travel device until it has performed its operation all the way to the end of the pipeline section. The internal clamping action of the plug to the pipeline section is then released and the cradling side boom 23 is able to take the cradle 21, line travel device 12 and the plug 10 as one combined unit and insert the plug into the end of the second pipeline section 16 to be worked on. Internal clamping forces are again applied between the plug and the pipeline section and the cradle and line travel device can roll onto the second pipeline section and begin to perform its operation.

Figure 2:
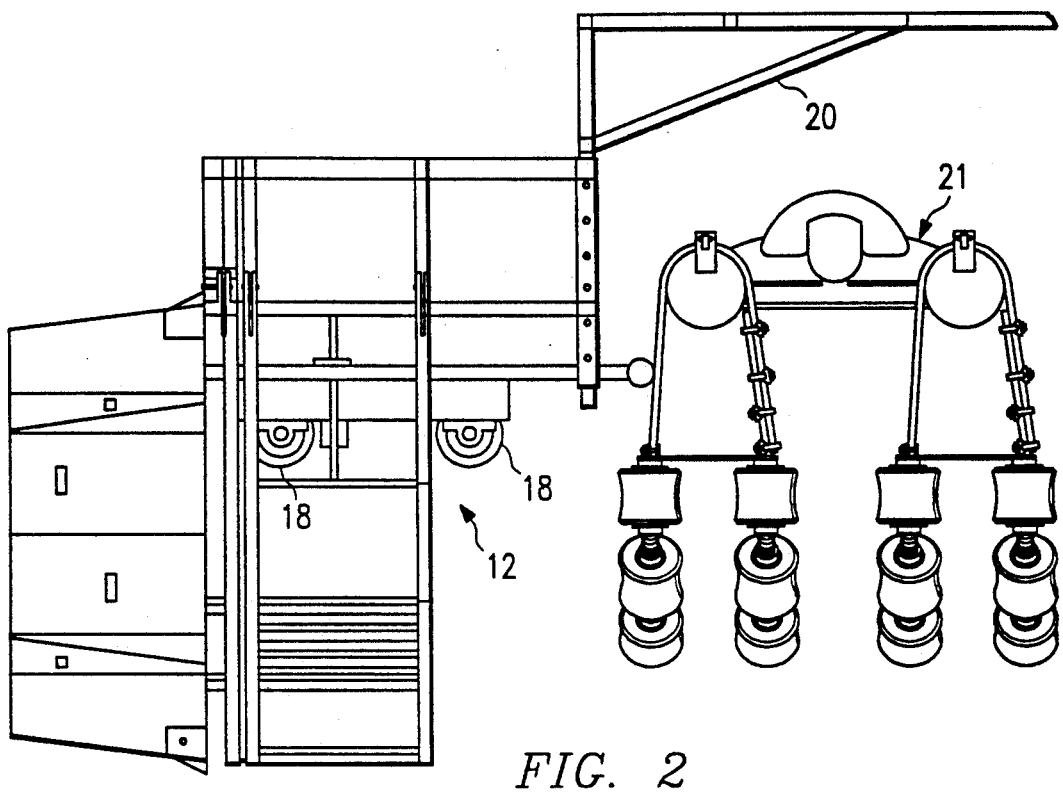
FIG. 2 is a side view of a line travel coater device.
Figure 4:
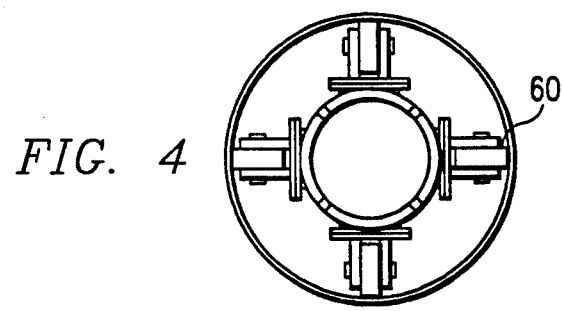
FIG. 4 is an illustrative end view of the clamp showing the guide wheels.

With reference to FIG. 2, a typical line travel device 12 is illustrated which forms a coater device for coating the pipeline. The device 12 has a plurality of wheels 18 which allow it to roll along the pipeline section while working on the pipeline. Most commonly, the wheels are powered so that the speed of the device along the pipeline is determined by the operation of the line travel device. The line travel device 12 has a frame 20 which straddles the load lines of the cradling side boom 23 to keep the line travel device 12 in a vertical orientation.

With reference to FIG. 3, the basic construction of the plug 10 can be understood. The plug 10 includes an outer pipe 22 which has approximately the same outer diameter as the pipeline sections 14 and 16. The line travel device 12 and cradles 21 are supported on this outer pipe after coming off the pipeline section. An inner pipe centering support 24 is sized to be slightly smaller than the internal diameter of the pipeline sections being worked on. Each inner pipe centering support 24 extends outwardly from the outer pipe 22 along the center axis 26 of the plug. Centering support 24 is inserted within the end of the pipeline section and provides support for the end of the pipeline section and prevents deformation of the end beyond the elastic limits of the material. As will be clear from the discussion following, the outer pipe 22 and centering supports 24 are the only components of the plug 10 which are sized to a particular pipeline dimension. Thus, different outer pipes 22 and centering supports 24 can be used with the remainder of the plug mechanism to adapt the plug for use on other size pipelines. For example, outer pipe 22 and centering supports 24 can be for a 26 inch pipe, while the remainder of the mechanism could be usable for pipes from 20 inches to 36 inches.

Figure 5:
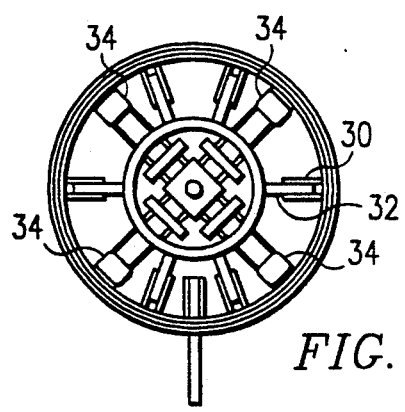
FIG. 5 is a illustrative end view of the clamp showing the connection between the central housing and the outer pipe.
Figure 9:
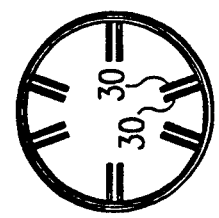
FIG. 9 is an end view of an inner pipe centering support.
Figure 8:
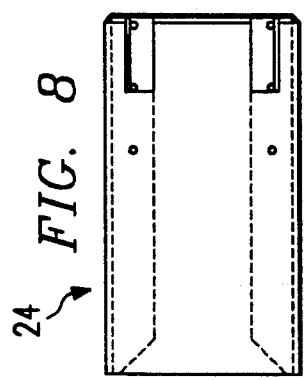
FIG. 8 is a side view of the an inner pipe centering support.
Figure 10:
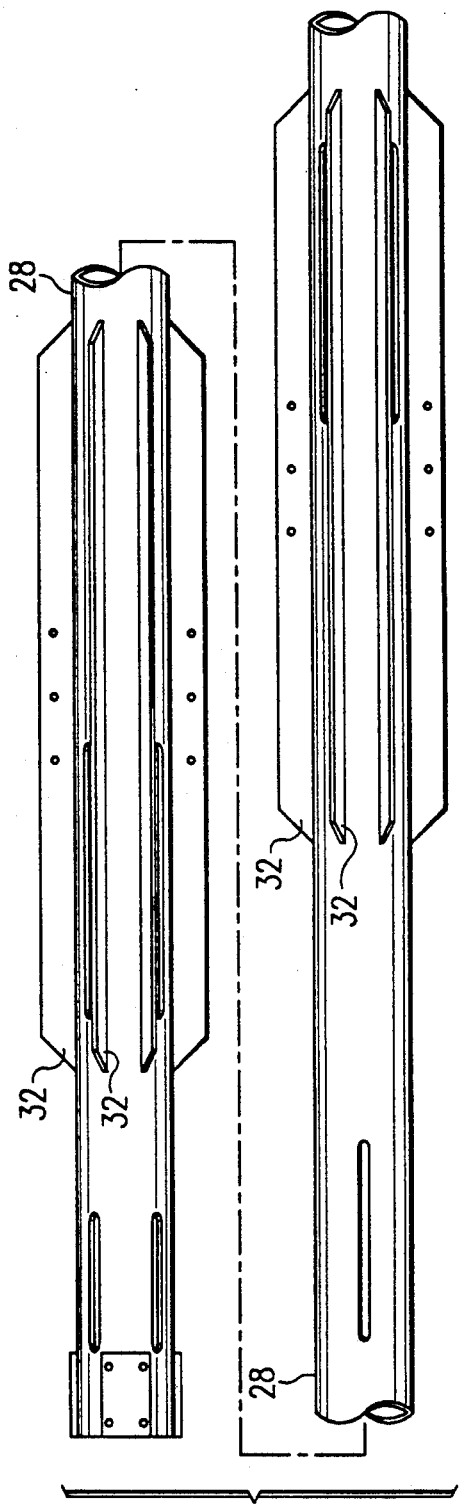
FIG. 10 is a side view of the central housing.
Figure 11:
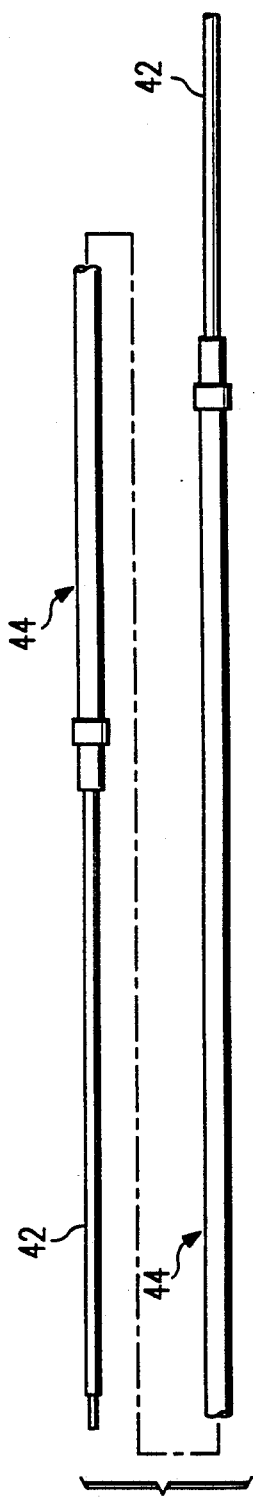
FIG. 11 is a side view of the load screws and connecting shaft.

A central housing 28 extends through both outer pipe 22 and centering supports 24. The central housing 2 is the main structural member of the plug through which all forces in the plug are ultimately transferred when the plug is under load. The central housing also includes the operating mechanisms described hereinafter. Inner pipe support members 30 are welded to the inner pipe centering support 24 and extend radially inward toward the axis 26 as best seen in FIG. 5. Central housing support members 32 are welded to the central housing 28 and extend radially outward from the axis 26 as seen in FIG. 5. The members 32 nest between adjacent members 30 to align and attach the outer pipe 22 and centering supports 24 to the central housing 28. Members 32 can be bolted to members 30, or other suitable attachment mechanisms can be used.

Four tensioning feet 34 are mounted at each end of the central housing outwardly of the supports 24. Fewer or more feet can be used if desired. The feet can have an exterior face 25 of a friction enhancing material such as polyurethane. The tensioning feet 34 engage the inner diameter of the pipeline section and hold the plug clamped to the pipeline section. The tensioning feet 34 are mounted on pivoting tensioning arms 36, with three tensioning arms 36 supporting each of the tensioning feet. The outward two tensioning arms 36 for each tensioning foot are pivotally attached at their inner end to a traveling nut 38. The innermost tensioning arm 36 is pivotally attached to a stationary support 40.

The traveling nuts 38 are, in turn, threadedly engaged on load screws 42 at each end of the plug. The two load screws 42 are connected together for joint rotation about the axis 26 by a connecting shaft 44 which is supported within the central housing by three, or less or more shaft supports 46. The load screws 42 and connecting shaft 44 are constrained to prevent motion along the axis 26 by end caps 48 at each end of the plug. A portion of each load screw 42 extends through each end cap 48 to mate with a device such as a crank 50. As will be apparent, if either cranking device is operated to rotate the load screws 42 and connecting shaft 44 in one direction, the tensioning feet move radially outward at both ends of the plug. If one end of the plug is inserted within a pipeline section, the tensioning feet at that end will move into clamping engagement with the inner surface of the pipeline section. The stationary supports 40 insure that the tensioning feet will remain parallel to the inner surface of the pipeline section as they move into engagement with the pipeline section.

A pair of cradle traps 52 and 54 are pivoted to the outer pipe 22 and can fall outside of the outer diameter of the outer pipe 22 through slots 56 formed in the pipe. The cradle traps are used to stop and hold the cradle 21 at the desired position. The rear cradle trap 52 swings up through slot 56 and into a similar slot 57 in central housing 28 as the cradle 21 passes over, then falls down into the lock position. The forward cradle trap 54 remains in the lock position extending out of the pipe 22 and the traps 52 and 54 combine to lock the cradle in one location on the plug. When the plug is inserted in the next pipe section to be treated, the trap 54 can be lifted and the cradle 21 can be moved off the plug onto the pipeline section.

It is preferable to install balancing weights 58 at one end of the plug to counterbalance the weight of the line travel device and the plug so that the entire system is in balance around the center line of the cradle 21 when in the locked position locked by the traps 52 and 54.

Wheel assemblies 60 are mounted at each end of the plug to facilitate the plug's insertion into the pipeline section. During installation, the tensioning feet are moved radially inward toward the axis 26 sufficient so that the wheels will contact the inner surface of the pipeline section. As the tensioning feet 34 move radially outward by rotation of the screws 42, the feet will extend radially farther outward than the wheels and the wheels will be lifted off the interior surface of the pipeline section. Preferably, the wheel assemblies are mounted on a conically shaped stabbing guide 62 at each end of the plug which facilitates the plug insertion within the pipeline section.

In operation, the catch-off side boom will insert the plug into the end of the pipeline section being worked on. A laborer will apply the clamping pressure to hold the plug in place by turning the load screws 42 with a cranking device. If desired, a nonhuman power source can be used to clamp the feet including, for example, a hydraulic, air or electric motor to rotate the screws and shaft 44.

The cradling side boom 23 will move the cradle 21 along the pipeline section until it engages the traps 52 and 54 on the plug. The line travel device 12 continues operation until it engages the cradle 21 and ceases operation. The line travel device is then secured to the cradle by an operator. The internal clamping force is then released by turning the load screws 42 in the opposite direction. The cradling side boom 23 then takes the cradles 21, line travel device 12 and plug 10 out of the line 14 just worked on and inserts the opposite end of the plug into the new section of pipeline 16 to be worked on. The operator again applies internal clamping pressure to hold the plug in place by turning the load screws 42 from the exposed end of the plug, which previously was hidden within the end of the previous pipeline section 14. The line travel device is uncoupled from the cradle 21 and the cradling side boom 23 moves the cradle 21 and the line travel device 12 onto the new section of pipeline 16 to begin treatment operations on the new section 16.

The present invention provides a number of improvements over the prior techniques. The time to get off of one pipeline section and on to the next is reduced at least by one-half to 20 to 30 minutes. Line travel equipment normally operates in the range of 15 linear feet per minute. This reduction in time can amount to as much as an additional 1500 feet of production per day without any increase in labor costs or equipment requirements. The line travel unit does not have to be stopped until it has completed the entire section, up to and including the end of the pipeline section. The quality of treatment at the end of the pipeline section therefore does not suffer.

With the positive movement of the line travel device on the plug, the danger of damaging the line travel device as it is moved from one pipeline section to another is greatly reduced. Also, the possibility of injury to workers is greatly decreased. Workers no longer will have to climb up on the equipment to hook and unhook load lines. The equipment, including plug 10, cradle 21 and the line travel device 12 will be moved at one time. Inserting the plug in the end of the new pipeline section does not require workers to be in close proximity to the equipment or stabbing guides, decreasing the chance for accidents.

Although a single embodiment of the invention has been illustrated in the accompanying drawings, and described in the foregoing detailed description, it will be understood that the invention is not limited to the embodiment disclosed, but is capable of numerous rearrangements, modifications and substitutions of parts and elements without departing from the scope and spirit of the invention.

I claim:

1. A plug for use in handling a line travel device on pipeline sections, wherein the line travel device moves along the length of a first pipeline section for performing an operation on the first pipeline section to a first end of the first pipeline section, and the line travel device is subsequently transferred to a second pipeline section for performing an operation on that second pipeline section while moving along the length of said second pipeline section from a second end thereof, comprising:

a central housing;

an outer pipe secured about the central housing and having an outer diameter approximately equal to the outer diameter of the first and second pipeline sections; and a diameter expanding structure mounted on the central housing for increasing the effective diameter of the plug along a portion of its length, said diameter expanding structure being capable of expanding from a first diameter, which permits said portion to be inserted within the end of one of said first and second pipeline sections, to a second diameter which clamps the plug to the inner surface of said end of one of said first and second pipeline sections;

whereby the line travel device can work on the first pipeline section to the first end thereof and move onto the outer pipe when the plug is clamped to said first end of the first pipeline section, the line travel device and plug can transfer to the second pipeline section to clamp the plug to the second end of said second pipeline section, so that the line travel device can subsequently move onto the second pipeline section for working the second pipeline section;

wherein said diameter expanding structure for increasing the effective diameter of a portion of the plug includes a load screw mounted on said central housing for rotational motion about a center axis of the plug, at least a pair of traveling nuts threaded onto said load screw, at least a pair of tensioning arms, each tensioning arm being pivoted at one end thereof to a responsive one of the traveling nuts, a tensioning foot, the opposite end of each of the tensioning arms being pivotally secured to the tensioning foot so that the tensioning foot is constrained for movement radially outward from the center axis, and a tensioning arm pivotally secured between the tensioning foot and said central housing, whereby rotation of the load screw causes the tensioning foot to move radially inward and outward relative to the center axis.

2. The plug of claim 1 having a diameter expanding structure at each end of the outer pipe for increasing the effective diameter of a portion of the plug at each end of the outer pipe so that a first one of the diameter expanding structures can be clamped to the first pipeline section to receive the line travel device onto the outer pipe and a second one of the diameter expanding structures can be subsequently clamped to the second pipeline section to transfer the line travel device onto the second pipeline section with the line travel device moving in a single direction from the first pipeline section to the second pipeline section.

3. The plug of claim 1 further having an inner pipe centering support mounted to the central housing and having dimensions to fit within the inner diameter of said end of one of said first and second pipeline sections to center the plug before clamping the plug to said end of one of said first and second pipeline sections.

4. The plug of claim 1 wherein said diameter expanding structure for increasing the effective diameter of a portion of the plug includes a plurality of tensioning feet pivotally mounted to the central housing for radial motion between the first diameter and the second diameter.

5. The plug of claim 2 further having an inner pipe centering support mounted to the central housing and having dimensions to fit within the inner diameter of said end of one of said first and second pipeline sections to center the plug before clamping the plug to said end of one of said first and second pipeline sections.

6. The plug of claim 5 wherein said diameter expanding structure for increasing the effective diameter of a portion of the plug includes a plurality of tensioning feet pivotally mounted to the central housing for radial motion between the first diameter and the second diameter.

7. The plug of claim 2 wherein said diameter expanding structure for increasing the effective diameter of a portion of the plug includes a plurality of tensioning feet pivotally mounted to the central housing for radial motion between the first diameter and the second diameter.

8. The plug of claim 3 wherein said diameter expanding structure for increasing the effective diameter of a portion of the plug includes a plurality of tensioning feet pivotally mounted to the central housing for radial motion between the first diameter and the second diameter.

9. Apparatus for transferring a line travel device from one end of a first pipe section to one end of a second pipe section, wherein each of said first and second pipe sections has an inner diameter and an outer diameter, said apparatus comprising:

a central housing;

an outer pipe having a first end and a second end, said outer pipe being secured about said central housing and having an outer diameter at least substantially equal to the outer diameter of said first and second pipe sections;

a first diameter expanding structure mounted on said central housing and extending longitudinally beyond said first end of said outer pipe; and a second diameter expanding structure mounted on said central housing and extending longitudinally beyond said second end of said outer pipe;

wherein each of said first and second diameter expanding structures includes a load screw mounted on said central housing for rotational motion about a center axis of the outer pipe, at least a pair of traveling nuts threaded onto said load screw, at least a pair of tensioning arms, each tensioning arm being pivoted at one end thereof to a respective one of the traveling nuts, a tensioning foot, the opposite end of each of the tensioning arms being pivotally secured to the tensioning foot so that the tensioning foot is constrained for movement radially outward from the center axis, and a tensioning arm pivotally secured between the tensioning foot and said central housing, whereby rotation of the load screw causes the tensioning foot to move radially inward and outward relative to the center axis;

wherein each of said first and second diameter expanding structures is capable of expanding from a first diameter, which is less than the inner diameter of said first and second pipe sections, to a second diameter which is at least as great as the inner diameter of said first and second pipe sections so as to clamp the apparats to the one end of said first and second pipe sections into which the respective one of said first and second diameter expanding structures is inserted;

whereby the line travel device can move from said first pipe section onto said outer pipe when said first diameter expanding structure is within said one end of said first pipe section and the diameter of said first diameter expanding structure has been expanded from said first diameter to said second diameter, and then the line travel device can move from said outer pipe onto said second pipe section when said second diameter expanding structure is within said one end of said second pipe section and the diameter of said second diameter expanding structure has been expanded from said first diameter to said second diameter.

10. Apparatus in accordance with claim 9 having a central longitudinal axis, and wherein each diameter expanding structure includes a plurality of tensioning feet pivotally mounted to said central housing for motion of each tensioning foot inwardly and outwardly with respect to said central longitudinal axis.

11. Apparatus in accordance with claim 10 wherein each tensioning foot is pivotally mounted to said central housing by at least a pair of arms, so that the respective tensioning foot can move at least generally radially outward from the central longitudinal axis of the apparatus.

12. Apparatus in accordance with claim 11 further comprising a drive element for causing the tensioning feet in one of said diameter expanding structures to move outwardly into clamping engagement with the inner surface of the one end of the respective one of said first and second pipe sections.

* * * * *

UNITED STATES PATENT AND TRADEMARK OFFICE
CERTIFICATE OF CORRECTION

PATENT NO. : 5,265,647

DATED : November 30, 1993

INVENTOR(S) : Taylor et al.

It is certified that error appears in the above-identified patent and that said Letters Patent is hereby corrected as shown below:

Column 3, Brief Description of the Drawings, line 60, delete the first word --to--.

Column 4, line 11, delete the word --the--.

Column 5, line 12, delete the --2-- and insert --28--.

Column 7, line 59, delete the word --responsive-- and insert the word --respective--.

Column 9, line 20, delete the word --apparats-- and insert the word --apparatus--.

Signed and Sealed this

Seventeenth Day of May, 1994

Attest:

BRUCE LEHMAN

Attesting Officer     Commissioner of Patents and Trademarks